United States Patent
Rezvani et al.

(10) Patent No.: US 8,446,998 B2
(45) Date of Patent: May 21, 2013

(54) MULTIPLE ANTENNA RECEIVER SYSTEM AND METHOD

(75) Inventors: Behrooz Rezvani, San Ramon, CA (US); Farrokh Farrokhi, San Ramon, CA (US); Andrea Goldsmith, Menlo Park, CA (US)

(73) Assignee: Quantenna Communications, Inc., Fremont, CA (US)

( * ) Notice: Subject to any disclaimer, the term of this patent is extended or adjusted under 35 U.S.C. 154(b) by 670 days.

(21) Appl. No.: 12/299,470

(22) PCT Filed: May 4, 2007

(86) PCT No.: PCT/US2007/010845
§ 371 (c)(1),
(2), (4) Date: Mar. 19, 2009

(87) PCT Pub. No.: WO2007/130578
PCT Pub. Date: Nov. 15, 2007

(65) Prior Publication Data
US 2010/0020907 A1    Jan. 28, 2010

Related U.S. Application Data (60) Provisional application No. 60/797,956, filed on May 4, 2006, provisional application No. 60/810,036, filed on May 31, 2006.

(51) Int. Cl.
*H04B 7/10*    (2006.01)
*H04L 1/02*    (2006.01)

(52) U.S. Cl.
USPC ........... 375/347; 375/346; 375/267; 375/260; 375/285; 375/229; 455/277.2; 455/134

(58) Field of Classification Search
USPC ......... 375/136, 144, 147–148, 316, 340–341, 375/348–349, 347, 346, 350, 267, 260, 285, 375/229–235; 455/13.1, 130, 132, 146, 277.1, 455/277.2, 134
See application file for complete search history.

(56) References Cited

U.S. PATENT DOCUMENTS

| | | | |
|---|---|---|---|
| 5,131,006 A * | 7/1992 | Kamerman et al. | 375/130 |
| 5,268,695 A * | 12/1993 | Dentinger et al. | 342/357.27 |
| 5,303,396 A * | 4/1994 | Ooyagi et al. | 455/134 |
| 5,729,558 A | 3/1998 | Mobin | |
| 6,032,033 A * | 2/2000 | Morris et al. | 455/277.2 |
| 6,035,007 A | 3/2000 | Khayrallah et al. | |

(Continued)

FOREIGN PATENT DOCUMENTS

| | | |
|---|---|---|
| WO | WO-2007021159 | 2/2007 |
| WO | WO-2007130578 A2 | 11/2007 |

OTHER PUBLICATIONS

Co-pending U.S. Appl. No. 11/653,135, filed Jan. 11, 2007.

(Continued)

*Primary Examiner* — Phuong Phu (57) ABSTRACT

A technique for processing received signals in multiple-antenna systems. Received signals from the different antennas may be amplified by a Low Noise Amplifier (LNA) and time-multiplexed by a switch to form a single analog signal. The time-multiplexed analog signal is down-converted and processed using a single RF chain for each signal component. This may result in an N-fold decrease in hardware in multiple antenna receiver systems.

5 Claims, 7 Drawing Sheets

U.S. PATENT DOCUMENTS

| | | | |
|---|---|---|---|
| 6,081,700 A | 6/2000 | Salvi et al. | |
| 6,351,499 B1 | 2/2002 | Paulraj et al. | |
| 6,470,047 B1 | 10/2002 | Kleinerman et al. | |
| 6,477,208 B1 | 11/2002 | Huff | |
| 6,477,213 B1* | 11/2002 | Miyoshi et al. | 375/347 |
| 6,484,285 B1 | 11/2002 | Dent | |
| 6,642,904 B2 | 11/2003 | Yokoshima et al. | |
| 6,807,404 B2* | 10/2004 | Meijer | 455/277.2 |
| 6,871,052 B2* | 3/2005 | Spencer et al. | 455/226.2 |
| 6,967,598 B2 | 11/2005 | Mills | |
| 7,035,343 B2 | 4/2006 | Chi et al. | |
| 7,058,422 B2 | 6/2006 | Learned et al. | |
| 7,076,263 B2 | 7/2006 | Medvedev et al. | |
| 7,127,013 B2* | 10/2006 | Steele et al. | 375/347 |
| 7,194,237 B2 | 3/2007 | Sugar et al. | |
| 7,224,743 B2 | 5/2007 | Holmes et al. | |
| 7,298,715 B2* | 11/2007 | Hendler | 370/317 |
| 7,298,798 B1 | 11/2007 | Chao et al. | |
| 7,321,636 B2 | 1/2008 | Harel et al. | |
| 7,400,872 B2* | 7/2008 | Kogure | 455/277.2 |
| 7,415,079 B2 | 8/2008 | Cameron et al. | |
| 7,450,657 B2 | 11/2008 | Paulraj et al. | |
| 7,533,327 B2 | 5/2009 | Heiman et al. | |
| 7,564,931 B2 | 7/2009 | Venkataramani et al. | |
| 7,623,836 B1* | 11/2009 | Finkelstein | 455/277.1 |
| 7,636,554 B2* | 12/2009 | Sugar et al. | 455/73 |
| 7,801,248 B2* | 9/2010 | Challa et al. | 375/316 |
| 2002/0163879 A1 | 11/2002 | Li et al. | |
| 2003/0003863 A1 | 1/2003 | Thielecke et al. | |
| 2003/0081701 A1 | 5/2003 | Pick et al. | |
| 2003/0087673 A1 | 5/2003 | Walton et al. | |
| 2003/0141938 A1 | 7/2003 | Poklemba et al. | |
| 2003/0157954 A1 | 8/2003 | Medvedev et al. | |
| 2003/0185309 A1 | 10/2003 | Pautler et al. | |
| 2004/0013209 A1 | 1/2004 | Zehavi et al. | |
| 2004/0153679 A1* | 8/2004 | Fitton et al. | 713/322 |
| 2004/0234012 A1* | 11/2004 | Rooyen | 375/347 |
| 2004/0240486 A1 | 12/2004 | Venkatesh et al. | |
| 2005/0053172 A1* | 3/2005 | Heikkila | 375/333 |
| 2005/0075081 A1* | 4/2005 | Catreux-Erceg et al. | 455/78 |
| 2005/0085269 A1 | 4/2005 | Buljore et al. | |
| 2005/0099937 A1 | 5/2005 | Oh et al. | |
| 2005/0113041 A1 | 5/2005 | Polley et al. | |
| 2005/0130694 A1 | 6/2005 | Medvedev et al. | |
| 2005/0170839 A1 | 8/2005 | Rinne et al. | |
| 2005/0192019 A1 | 9/2005 | Kim et al. | |
| 2005/0195784 A1 | 9/2005 | Freedman et al. | |
| 2005/0220057 A1* | 10/2005 | Monsen | 370/334 |
| 2005/0245201 A1 | 11/2005 | Ella et al. | |
| 2005/0265470 A1 | 12/2005 | Kishigami et al. | |
| 2005/0276361 A1 | 12/2005 | Kim et al. | |
| 2006/0034217 A1 | 2/2006 | Kwon et al. | |
| 2006/0034221 A1 | 2/2006 | Karaoguz et al. | |
| 2006/0083290 A1 | 4/2006 | Shin et al. | |
| 2006/0094385 A1* | 5/2006 | Rafati | 455/272 |
| 2006/0223487 A1 | 10/2006 | Alam et al. | |
| 2006/0270427 A1 | 11/2006 | Shida et al. | |
| 2006/0276227 A1 | 12/2006 | Dravida | |
| 2007/0136446 A1 | 6/2007 | Rezvani et al. | |
| 2007/0153924 A1 | 7/2007 | Ling et al. | |
| 2007/0202818 A1 | 8/2007 | Okamoto | |
| 2007/0230638 A1* | 10/2007 | Griniasty | 375/347 |
| 2007/0258534 A1 | 11/2007 | Schmidt | |
| 2008/0139123 A1 | 6/2008 | Lee et al. | |
| 2008/0159123 A1* | 7/2008 | Tehrani et al. | 370/208 |
| 2010/0091891 A1* | 4/2010 | Calando et al. | 375/260 |

OTHER PUBLICATIONS

Final Office Action Mailed May 11, 2010 in Co-pending U.S. Appl. No. 11/653,135, filed Jan. 11, 2007.

Non-Final Office Action Mailed Dec. 31, 2009 in Co-pending U.S. Appl. No. 11/653,135, filed Jan. 11, 2007.

Non-Final Office Action Mailed Jun. 8, 2009 in Co-pending U.S. Appl. No. 11/653,135, filed Jan. 11, 2007.

Co-pending U.S. Appl. No. 11/800,378, filed May 4, 2007.

Co-pending U.S. Appl. No. 11/872,700, filed Oct. 15, 2007.

Co-pending U.S. Appl. No. 12/288,569, filed Oct. 20, 2008.

Co-pending U.S. Appl. No. 11/800,357, filed May 4, 2007.

Non-Final Office Action Mailed May 4, 2010 in Co-pending U.S. Appl. No. 11/800,357, filed May 4, 2007.

Giallorenzi et al., "Noncoherent Sequence Demodulation for Trellis Coded M-DPSK", Military Communications Conference, 1991, MILCOM '91, Conference Record, Military Communication in a Changing World, IEEE, vol. 3, Nov. 1991, pp. 1023-1027.

Kong et al., "Detection of Amplitude-Phase Modulated Signals Over Frequency Nonselective Rayleigh Fading Channels with Adaptive Symbol-Aided Channel Estimation", 1996, Vehicular Technology Conference, 1996, Mobile Technology for the Human Race, IEEE 46th, vol. 2, pp. 983-987.

Written Opinion of PCT/US07/10845 dated Jul. 28, 2008, pp. 1-7.

International Search Report of PCT/US2008/011965 dated Mar. 25, 2009, pp. 1-3.

Written Opinion of PCT/US2008/011965 dated Mar. 25, 2009, pp. 1-6.

Rafati et al., IEEE Custom Integrated Circuit Conference, pp. 41-1:357-361 (2005).

Rafati et al., IEEE Journal of Solid State Circuits, 42(6):1291-1299 (2007).

International Search Report, PCT/US07/10845, (Jul. 28, 2008).

Non-Final Office Action Mailed Aug. 5, 2010, in Co-Pending U.S. Appl. No. 11/872,700, filed Oct. 15, 2007.

Office Action mailed May 4, 2011 from U.S. Appl. No. 11/653,135, filed Jan. 11, 2007.

Office Action mailed Dec. 7, 2010 from U.S. Appl. No. 11/800,378, filed May 4, 2007.

Notice of Allowance mailed Mar. 17, 2011 from U.S. Appl. No. 11/800,378, filed May 4, 2007.

Office Action mailed Feb. 15, 2011 from U.S. Appl. No. 11/872,700, filed Oct. 15, 2007.

Notice of Allowance mailed May 23, 2011 from U.S. Appl. No. 11/872,700, filed Oct. 15, 2007.

Office Action mailed Dec. 22, 2010 from U.S. Appl. No. 11/800,357, filed May 4, 2007.

Notice of Allowance dated May 12, 2011 from U.S. Appl. No. 11/800,357, filed May 4, 2007.

\* cited by examiner

FIG. 7

MULTIPLE ANTENNA RECEIVER SYSTEM AND METHOD

CROSS REFERENCE TO RELATED APPLICATION

This application claims the benefit of prior filed PCT No.: PCT/US07/10845 filed May 4, 2007, which in turn claims Priority to Provisional Applications No. 60/797,956 filed on May 4, 2006 and No. 60/810,036 filed on May 31, 2006 both of which are incorporated herein by reference in their entirety as if fully set forth herein.

BACKGROUND

A wireless system may be implemented as a multiple-antenna receiver system (MARS), includes multiple-output (MO) communication systems. When a MO system has a single-antenna transmitter, it may be referred to as a single-input multiple-output (SIMO) system, and when the MO system has multiple-antenna transmitters, it may be referred to as a multiple-input multiple-output (MIMO) system. A MARS employs multiple antennas for performing spatial information processing. MARS are being incorporated into several industry standards including the IEEE 802.11n and WiMAX (IEEE 802.16) standards. MARS can also be used to improve performance of industry standards, such as Global Positioning Systems (GPS) and Digital Video Broadcasting (DVB), that do not require more than one antenna. MARS can also be used in multimode radios that can receive signals associated with multiple different systems.

The antennas of a MARS are adaptable for use in a manner that meets system performance objectives given application performance requirements, channel conditions, interference conditions, etc. Performance requirements may include specifications related to raw data rate, throughput, bit and/or packet error probability, average delay, delay jitter and/or system power consumption. MARS have the ability to adapt the way the receiver antennas are used as well as various transmission parameters such as transmit power, constellation size, channel coding scheme, frame length, etc.

Using multiple antennas in wireless transceivers may be advantageous. For example, system data rates can be increased through multiplexing. For another example, system performance can be improved by increasing link robustness through space-time coding, diversity-combining or more general beamforming. For another example, directional gain can be increased and/or interference can be reduced by steering the antenna beam in a given direction via beamsteering.

Although there are advantages to systems with multiple antennas at the transmitter and/or receiver, a disadvantage is the need for multiple RF transmit and/or receive signal paths, one path for each of the antennas. There are a number (N) of RF paths in a multiple-antenna transmitter or receiver employing N antennas, which generally leads to an N-fold increase in cost, size, and power consumption as compared to systems that do not employ multiple antennas such as SISO systems which have a single RF path at both the transmitter and receiver.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for multiple antenna receiver processing involves removing inter-antenna symbol interference (IASI) and inter-symbol interference (ISI) from a signal. A method according to the technique may involve receiving a plurality of signals from a plurality of antennas, each signal being associated with one of the plurality of antennas; multiplexing the signals from the plurality of antennas into a multiplexed signal; removing inter-antenna symbol interference (IASI) from the multiplexed signal; and removing inter-symbol interference (ISI) from the multiplexed signal.

A system constructed in accordance with the technique may include a switch for selecting one of a plurality of signal paths associated with a respective plurality of antennas, wherein, in operation, the switch is operable to select signal paths such that, over time, signals received from the plurality of antennas are multiplexed to form a single analog signal; and a sampled digital signal processing (DSP) block, coupled to the switch, for processing signals of the signal paths to remove inter-antenna symbol interference (IASI) and inter-symbol interference (ISI).

BRIEF DESCRIPTION OF THE DRAWINGS

Embodiments of the inventions are illustrated in the figures. However, the embodiments and figures are illustrative rather than limiting; they provide examples of the inventions.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
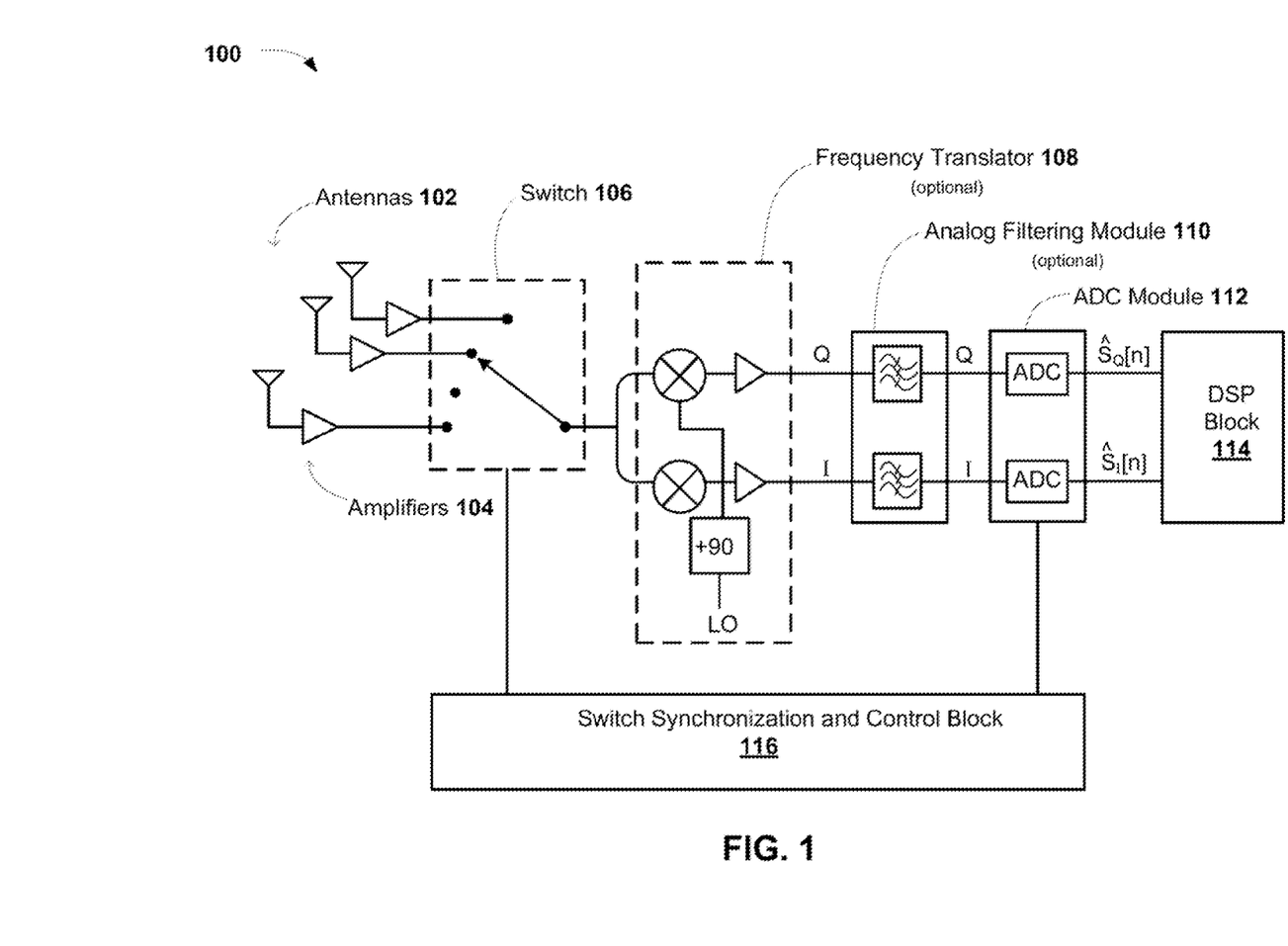
FIG. 1 depicts an example of an RF portion of a sampled multiple-antenna receiver system (MARS).

FIG. 1 depicts an example of an RF portion of a sampled multiple-antenna receiver system (MARS) 100. The system 100 includes a plurality of N antennas 102, a plurality of amplifiers 104, a switch 106, an (optional) frequency translator 108, an analog filtering module 110, an analog-to-digital converter (ADC) module 112, and a sampled multiple-antenna digital signal processing (DSP) block 114.

In the example of FIG. 1, the plurality of antennas 102 is used to receive electromagnetic waves. MARS may use multiple antennas 102 to perform spatial information processing. Multiple antennas in a receiving device potentially offer significant advantages in data throughput, link range, link robustness, and interference/intersymbol interference reduction, without additional bandwidth or transmit power. This may be achieved by higher spectral efficiency through spatial multiplexing, higher link reliability and robustness through diversity and more general beamforming, and/or better directionality through beamsteering.

In the example of FIG. 1, the plurality of amplifiers 104 is used to amplify weak signals captured by the antennas 102. In the example of FIG. 1, one amplifier is used per antenna 102. In an illustrative embodiment, the amplifier being employed may be a low-noise amplifier (LNA) which may be located close to an antenna to avoid feedline losses. LNAs typically boost signal power while adding little noise or distortion.

In the example of FIG. 1, the switch 106 switches between antennas 102. This facilitates the formation of a single, time-multiplexed, analog signal. For N antennas and a switching rate of $1/T_s$ for the switch 106, the analog signal at the $i^{th}$ antenna, $s_i(t)$, is multiplexed every $1/(NT_s)$ second with the analog signals of the other antennas to form a single analog signal. If the spectrum of $s_i(t)$ is denoted by $S_i(f)$, then multiplexing $s_i(t)$ every $1/(NT_s)$ seconds results in a repetition of $S_i(f)$ every $NT_s$ Hertz in the frequency domain. The switch is controlled by the switch synchronization and control block that controls and synchronizes both the switching waveforms and the switch timing.

In the example of FIG. 1, the frequency translator 108, which is optional, may perform analog filtering on the received signal and/or frequency translation. The frequency translation may directly convert the multiplexed signal to a baseband frequency or a very low IF, or it may convert the multiplexed signal to an intermediate frequency (IF) or a low IF. With low-IF, the RF signal is downconverted to a non-zero low or moderate intermediate frequency, typically a few megahertz. Low-IF receiver topologies have many of the desirable properties of zero-IF architectures, but avoid the DC offset and 1/f noise problems.

Translation to baseband, very low IF, low IF, or IF produces an in-phase (I) signal component from the single analog input signal through multiplication with the local oscillator (LO) which is at the carrier frequency, a frequency slightly offset from the carrier frequency, or the difference between the carrier frequency and the IF. For translation to baseband, very low IF, or IF the frequency translation system 108 also produces a quadrature (Q) signal component from the single analog signal through multiplication with the LO shifted in phase by 90 degrees.

If the system 100 includes filtering, then the system 100 may include the optional analog filtering module 110. In a non-limiting embodiment, the frequency translator 108 may include a downconverter. In such an embodiment, an implementation is somewhat more likely to include the optional analog filtering module 110, though this is not a requirement. Each signal component (the I component, and the Q component when generated) passes through respective analog filtering in the analog filtering module 110. Alternatively, the frequency translator 108 could employ multiple stages of LO multiplication and filtering.

In the example of FIG. 1, when the system 100 includes the analog filtering module 110, the filter operating on each signal component is generally quite sharp to reduce the energy of out-of-band signals prior to analog-to-digital (A/D) conversion. This filtering generally spreads out the I- and Q-signal components in time. If the time spreading exceeds the switch sampling duration of $1/T_s$, then inter-antenna symbol interference (IASI) results between the I-signal components $s_{i,I}(t)$ and subsequent I-signal components. Similarly, if a Q-signal component is generated, then if the time spreading exceeds the switch sampling duration of $1/T_s$, then IASI results between the Q-signal components $s_{i,Q}(t)$ and subsequent Q-signal components. This IASI could degrade the performance of the sampled multiple-antenna system 100; however, it is generally removed in the DSP 114 through equalization (discussed below). The filters of the analog filtering module 110 may include, by way of example but not limitation, a Butterworth filter, Chebyshev filter, Elliptic filter, Bessel filter, and/or Gaussian filter.

In the example of FIG. 1, the ADC module 112 receives one or more analog signals and converts them to digital signals. The ADCs employed in the ADC module 112 receive the analog I-signal component (and Q-signal component when generated) and convert the signal(s) to digital form before they pass to the DSP block 114. The timing of the ADC is controlled by the switch synchronization and control block 116, which synchronizes the ADC timing to the switch timing. Any known or convenient component that is sufficiently precise to control the timing as indicated may be used in the switch synchronization and control block 116.

In operation, antennas 102 receive N signals, one signal for each $i^{th}$ antenna, where i=1, ..., N. After being received, each signal is amplified by its respective LNA 104. Then, the amplified signals pass to the switch 106. The switch 106 is time-multiplexed causing it to operate sequentially between the N inputs to form a single analog signal. Then, the signal passes to the frequency translation system 108 which translates the signal to an IF (which may be a zero-IF, very low IF, or low IF) and generates I- and possibly Q-signal components at this IF. The frequency translation system may also filter these IF signal component(s). Then, the signal components pass through the ADC module 112 which converts the input signal(s) into digital form. Then, the digital signal(s) pass to the DSP block 114.

Figure 2:
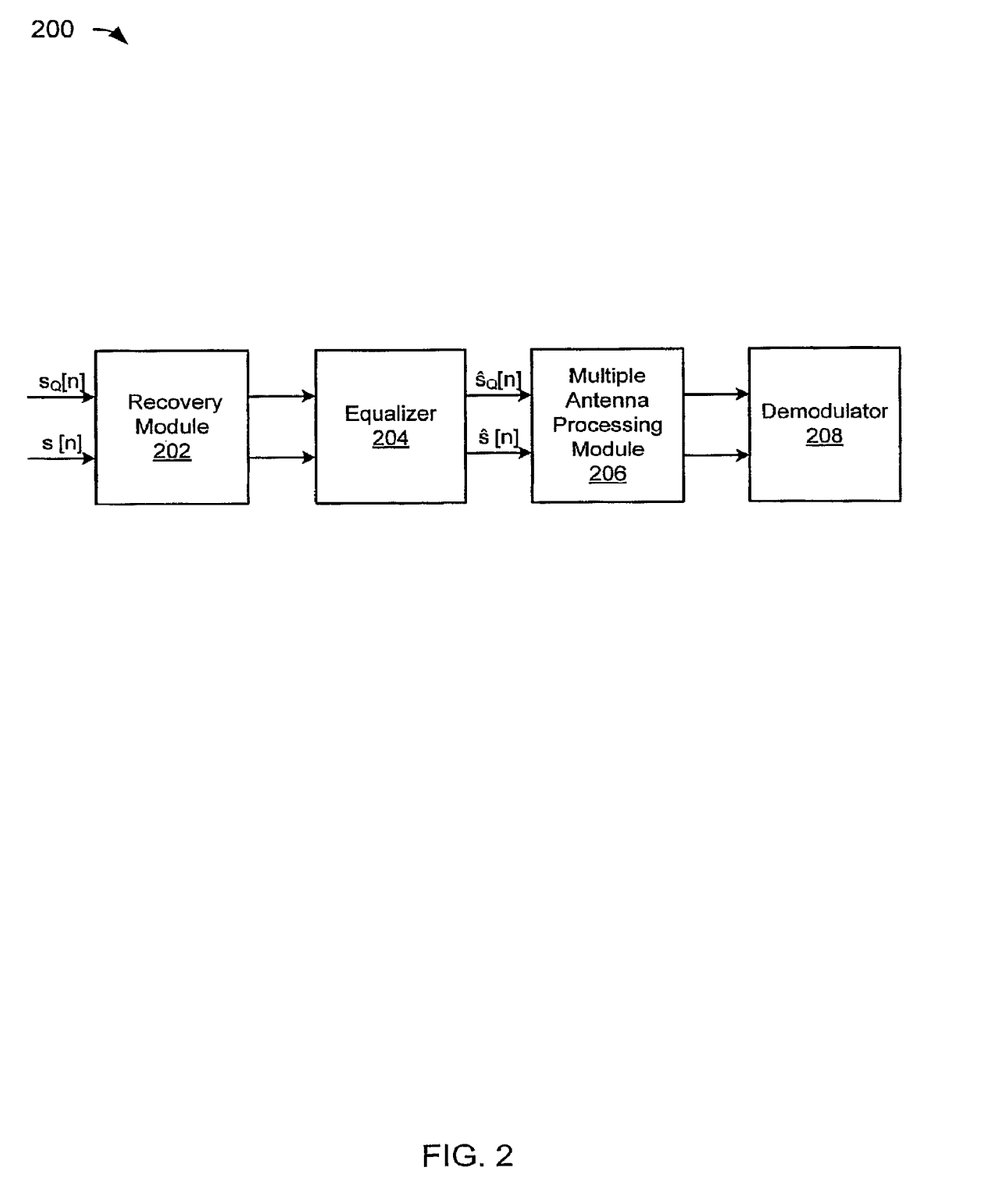
FIG. 2 depicts an example of a digital signal processing (DSP) block.

FIG. 2 depicts an example of a digital signal processing (DSP) block 200. The DSP block 200 may be suitable for use as the DSP module 114 (FIG. 1). The DSP module 100 or 200 includes a pre-processing module, recovery module 202, an equalizer 204, a multiple antenna processing module 206, and a demodulator 208. The DSP block 200 performs pre-processing, recovery, equalization, multiple-antenna space-timing (ST) processing, and demodulation.

A pre-processing module is optional depending on the frequency translation system. If the frequency translation system converts the multiple-antenna signal to an IF other than zero, then this pre-processing module can perform digital downconversion to baseband or another IF frequency. If the frequency translation system converts the signal to a low IF frequency, then the input to the pre-processing system is the I-signal component, and the pre-processing module can generate the Q-signal component from this I-signal component. A Hilbert transform may be used to generate the Q-signal component from the i-signal component. In a typical embodiment the pre-processing module will have two outputs consisting of samples of the I- and Q-signal components at baseband. Alternatively, the pre-processing module may output these signals at an IF, or may output just the I-signal component and do all subsequent signal processing on just this component. In the following discussion, processing is described on both the I and Q paths, however it is possible to perform this processing on only the I path or only the Q path, rather than both, or to have different processing on the I and Q paths.

The recovery module 202 recovers the timing, phase, and frequency of the I- and Q-signal components obtained from the multiple-antenna samples. It is possible that there is no Q component of a signal. The frequency and phase recovery is similar in the branches corresponding to the I- and Q-signal components. The timing recovery in each branch must be offset by the multiplexing period associated with the multiple antenna multiplexing. Timing, phase, and frequency recovery operations can employ maximum-likelihood (ML) based estimation of timing, phase, frequency, and combinations of these parameters. These ML techniques can be data-driven or based on a known preamble or training sequences. Approximations to the ML estimator, or lower complexity estimation techniques such as minimum mean-square-error, can also be used. Phase lock loops and/or Farrow resampling can also be used for refining an initial estimate of one or more of these parameters. This list of possible timing, phase, and frequency recovery techniques is not meant to be comprehensive, and known or convenient techniques for timing, phase, and frequency recovery could be used with the multiple-antenna sampling system.

After the timing, phase, and frequency recovery of the I- and Q-signal components samples, the equalizer 204 compensates for the IASI. In an alternative embodiment, equalizers could include nonlinear equalizers such as a decision-feedback equalizer. IASI may be introduced, for example, from the analog filtering module 110 (FIG. 1). In addition to compensating for the IASI, the equalizer could also compensate for inter-symbol interference (ISI) introduced by the channel on each of the antenna branches individually. The design of the equalizer 204 could be optimized for performance subject to complexity constraints. In an embodiment, equalizers could include a tapped-delay line equalizer based on zero-forcing or minimum mean-square error (MMSE) coefficients. Advantageously, the coefficients may be designed to minimize the impact of combined ISI and IASI. After the I- and Q-signal components have been equalized, they are passed to the multiple antenna processing module 206.

The multiple antenna processing module 206 includes, for example, the processes of space-time decoding, spatial demultiplexing, and/or beamforming. In particular, we may employ common techniques for spatial decoding and/or demultiplexing such as Alamouti decoding, BLAST decoding/demultiplexing and related techniques, and decoding/demultiplexing based on a singular-value matrix decomposition of the channel and transmission along independent Eigen-dimensions. Beamforming involves multiplying the samples associated with a given antenna by a complex gain and then summing these weighted samples of all antennas. Diversity-combining is a specific example of beamforming, and the beamforming complex gains to implement diversity-combining may include weights associated with maximal-ratio combining, equal-gain combining, selection-combining, or optimal-combining. Beamforming can also include beamsteering, whereby the complex antenna gains shift the phase of each antenna element to point the antenna pattern of the array in a given direction. Beamforming can also include weighting to minimize the mean-square-error for the received signal, or for a combination of beamsteering and diversity-combining.

The equalizer 204 output is for the I- and Q-signal components and can be either a vector of dimension N, where each vector element corresponds to one of the antenna samples, or a stream of multiplexed samples. The multiplexed samples are shown by way of example but not limitation in the example of FIG. 2 specifically. The vector is shown by way of example but not limitation in the example of FIGS. 3A and 3B. After equalization, every $N^{th}$ sample of the multiplexed samples of the I- and Q-signal components, $\hat{s}_I[n]$ and $\hat{s}_Q[n]$, corresponds to the digitized analog sample of the $i^{th}$ antenna input. Specifically, $\hat{s}_I[k]$, where $k=jN+i$, $j=1, 2, \ldots$, corresponds to the I-signal component of the A/D conversion of the $j^{th}$ time the analog switch samples $s_i(t)$. Similarly, $\hat{s}_Q[k]$, where $k=jN+i$, $j=1, 2, \ldots$, corresponds to the Q-signal component of the A/D conversion of the $j^{th}$ time the analog switch samples $s_i(t)$. (As has been mentioned previously, there is an embodiment where no Q-signal component is generated.) If the equalizer output is a vector, the $i^{th}$ element of the vector corresponds to analog switch samples of $s_i(t)$. These samples corresponding to each antenna's input can be space-time processed as if the samples were obtained from separate I and Q RF paths, one for each antenna. In other words, with approximately perfect equalization of the IASI, for the case of multiplexed outputs the samples $\hat{s}_I[k]$, where $k=jN+i, j=1, 2, \ldots$, and $\hat{s}_Q[k]$, where $k=jN+i, j=1, 2, \ldots$, are approximately identical to the samples that would be obtained from a multiple antenna receive system with N RF signal paths which are converted by the ADC at a sampling rate of $1/T_s$ on each signal path. Similarly, for the case of vector outputs with approximately perfect equalization of the IASI, the samples associated with the $i^{th}$ vector element are approximately identical to the samples that would be obtained from a multiple antenna receive system with N RF signal paths which are converted by the ADC at a sampling rate of $1/T_s$ on each signal path. Advantageously, antenna sampling may collapse the requirements for N RF signal paths into one signal path without degrading system performance, thereby gaining significant space and power savings over systems that do not collapse these requirements. The multiple antenna processing module 206 may be similar to that of a multiple antenna system with n RF signal paths.

The demodulator 208 demodulates the signal. This may apply demodulation techniques for QAM, PSK, and/or FSK associated with the transmitted signal. In addition, these modulations may be combined with a second level of modulation in the transmitted signal such as multicarrier modulation or CDMA, whose benefits include ISI reduction, interference reduction, and methods for multiple access. Examples of demodulation techniques that could be employed for this second level of modulation include, but are not limited to, orthogonal frequency division multiplexing (OFDM) techniques, direct sequence spread spectrum (DSSS) techniques, frequency-hopping spread spectrum (FHSS) techniques, and complementary code keying (CCK) techniques. The multiple antenna system of FIG. 1 or FIG. 2 may be used to receive signals associated with multiple radio signaling formats assuming the antennas are sufficiently wideband to pass the signals associated with these multiple formats. In this case the demodulation may adapt to the particular signaling format in operation, or may demodulate signals associated with multiple formats and/or radios simultaneously. If the different radio signals are in different frequency bands, then the demodulation may apply filtering to the signal in a given frequency band to remove the signals from other bands, then demodulate the signal in the given band. Alternatively, if the signals are in the same frequency band, some form of multi-user detection may be used. This multi-user detection may entail successive interference cancellation or simultaneous interference cancellation, for example using maximum-likelihood detection of multiple signals or an approximation to this ML detection.

Figure 3A:
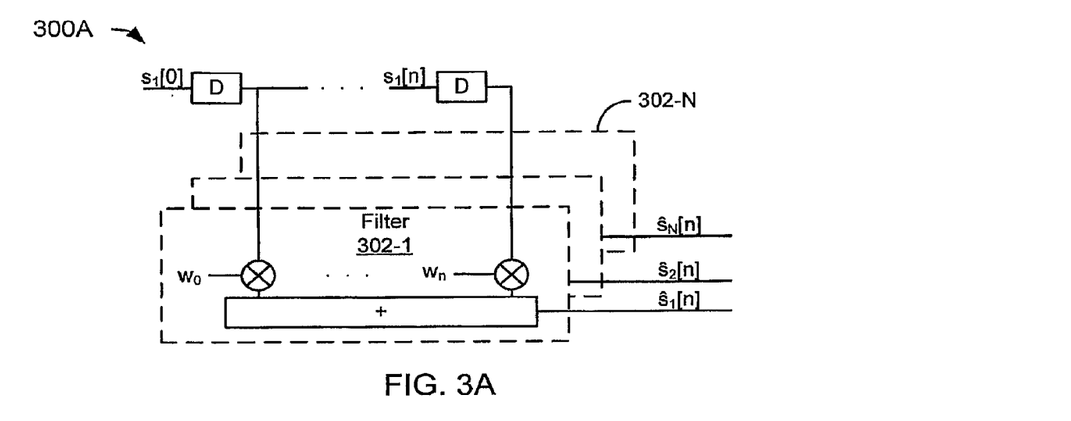
FIGS. 3A and 3B depict examples of equalizers for use in a DSP block.

FIG. 3A depicts an example of an equalizer 300A for use in a DSP block, such as the DSP block 200 (FIG. 2). In an illustrative embodiment, equalization is accomplished using a low-pass filter. In the example of FIG. 3A, the equalizer 300 includes filters 302-1 to 302-N (referred to collectively as filters 302), which are associated with respective antennas or groups of antennas. The filters 302 remove the IASI for each antenna individually, and possibly the ISI associated with the channel as well. The filter 302 may include any known or convenient filter that is suitable for the functionality described here, such as, by way of example but not limitation, a tapped-delay line filter.

Figure 3B:
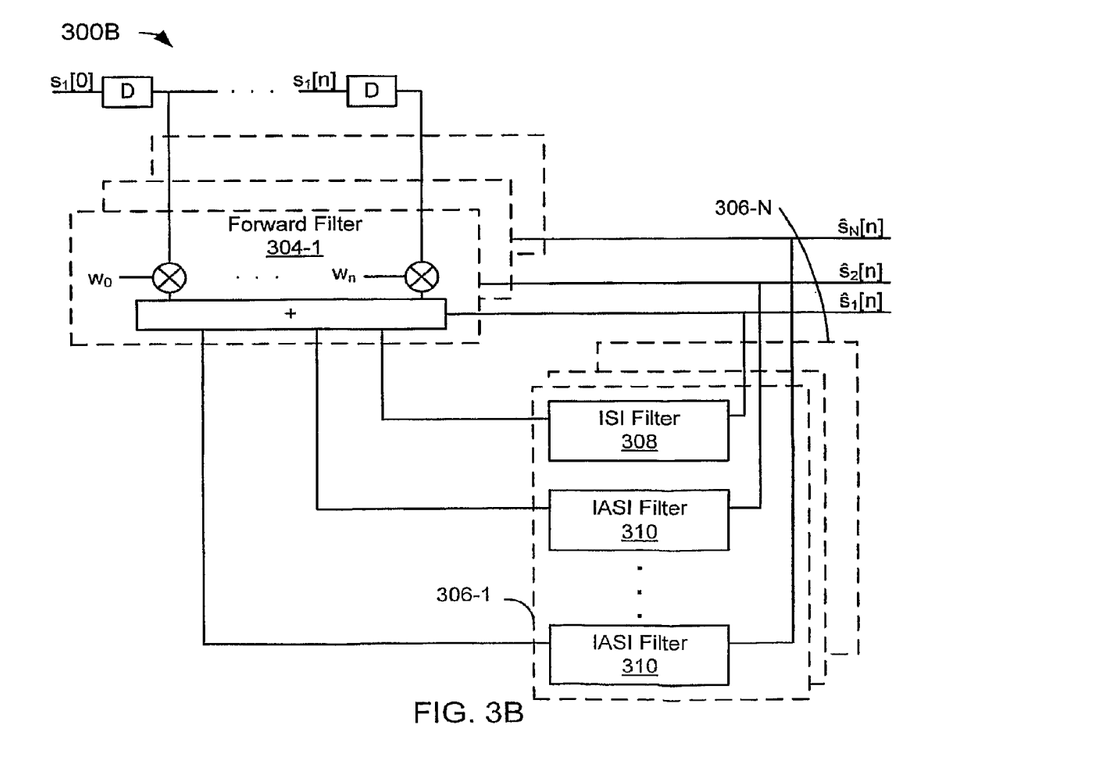

FIG. 3B depicts another example of an equalizer 300B for use in a DSP block, such as the DSP block 200 (FIG. 2). In the example of FIG. 3B, the equalizer 300B acts as a decision-feedback equalizer, and includes forward filters 304-1 to 304-N (referred to collectively as forward filters 304) and feedback filter banks 306-1 to 306-N (referred to collectively as feedback filter banks 306). In an illustrative embodiment, the equalizer 300B uses the forward filters 304 and the feedback filter banks 306 to remove IASI and ISI. The forward filters 304 are similar to the filters 302 (FIG. 3A): they remove the IASI and possibly ISI for each antenna individually. Thus, the output of the forward filters 304 associated with the $i^{th}$ antenna path is an approximation to the antenna sample without IASI or ISI. This approximation can then be passed through the feedback filter banks 306 to remove any residual IASI or ISI.

In the example of FIG. 3B, each of the feedback filter banks 306 include an ISI filter 308 and N−1 IASI filters 310. The ISI filter 308 for a particular signal path is fed back into the same signal path. For example, the signal path associated with antenna 1 includes an ISI filter 308 that is fed back from the antenna 1 signal path, and N−1 ASI filters 310 that are fed back from the other antenna signal paths. The feedback paths for antennas 2 to N are not depicted for illustrative simplicity. In general, the residual ISI on the $i^{th}$ antenna path is removed by passing the output of the $i^{th}$ forward filter through the $i^{th}$ feedback filter optimized to remove this residual ISI. The residual IASI on the $i^{th}$ antenna path caused by the $j^{th}$ antenna path is removed by passing the output of the $j^{th}$ forward filter through $j^{th}$ feedback filter associated with antenna path i that is optimized to remove this residual IASI.

It may be noted that the equalizer 300B shows how the filters 302 (FIG. 3A) are actually processing the signals of all antennas, though this is explicitly illustrated by the feedback filter bank 306 and implicitly in FIG. 3A.

Figure 4A:
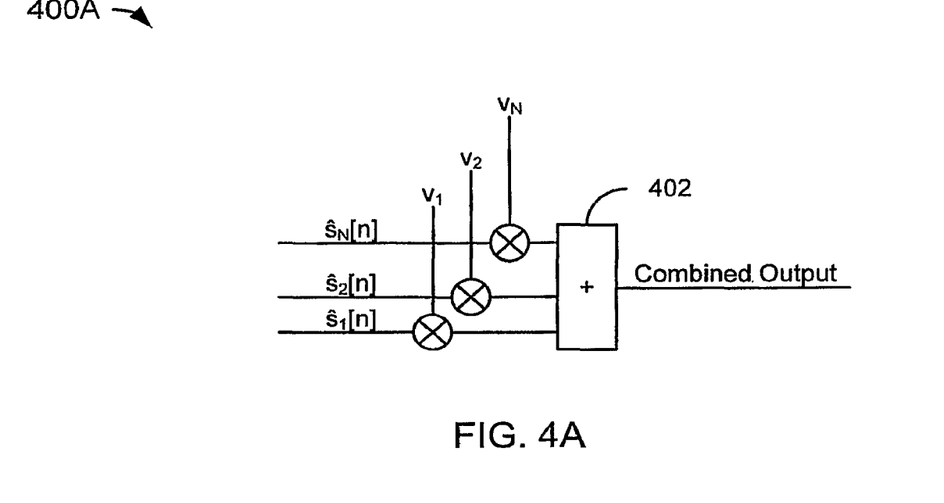
FIGS. 4A to 4D depict examples of alternative multiple antenna processing modules for use in a DSP block.

FIGS. 4A to 4D depict examples of alternative multiple antenna processing modules for use in a DSP block. FIG. 4A depicts a module 400A capable of MIMO beamforming. Weights $v_i$ may be based on diversity combining (e.g. MRC, EGC), beam steering (weights optimized to minimize interference, point in a given direction, etc) or a combination of these. In the example of FIG. 4A, multiple antenna space-time processing may be performed by space-time decoding and/or spatial demultiplexing. In an illustrative embodiment an equalizer is a tapped-delay line filter, which removes the IASI for each antenna individually, and possibly the ISI associated with the channel as well, then inputs the signals (antenna outputs) to the module 400A. The individual antenna outputs are then processed by the module 400A using a space-time decoder and/or spatial demultiplexor such as one that would operate on samples received from separate RF paths. Known or convenient techniques for spatial decoding and demultiplexing, such as Alamouti decoding, BLAST decoding/demultiplexing and related techniques, and decoding/demultiplexing based on a singular-value matrix decomposition of the channel and transmission along independent Eigen-dimensions, may be used.

Figure 4B:
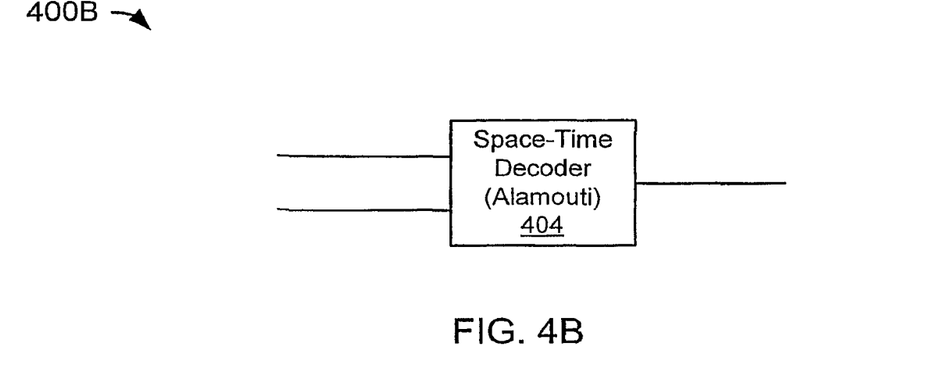
Figure 4C:
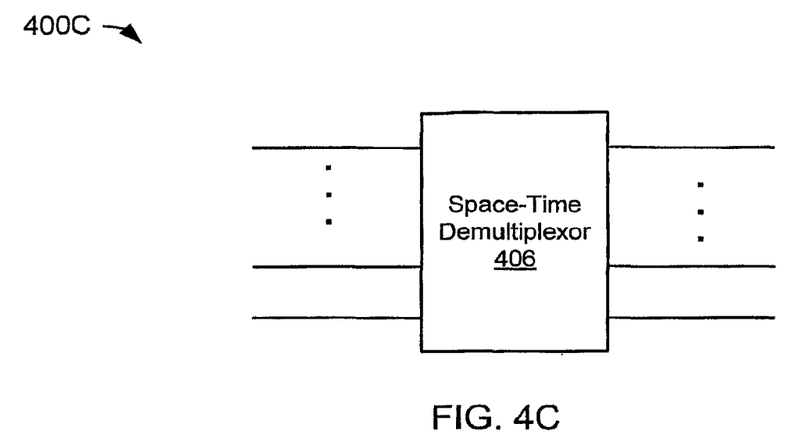
Figure 4D:
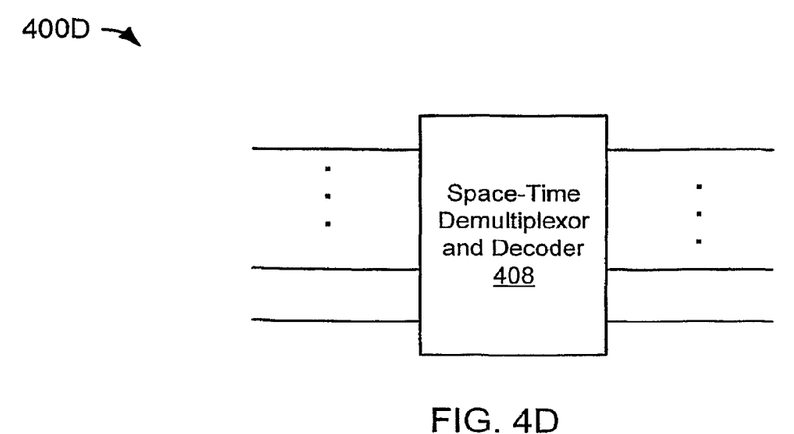

FIGS. 4B, 4C, and 4D depict respective modules 400B, 400C, and 400D, which are readily understandable. In the example of FIG. 4B, the module 400B may include a space-time decoder, typically an Alamouti code, which operates on only 2 antenna outputs to produce one output or 4 antenna outputs to produce 2 outputs (2 antenna outputs are depicted in the example of FIG. 4B, though a 4 antenna embodiment would use two such blocks so it is also captured conceptually by FIG. 4B). In the example of FIG. 4C, the module 400C may include a space-time demultiplexor, which performs a matrix multiplication on the input vector. In the example of FIG. 4D, the module 400D may include a space-time decoder and demultiplexor, which performs a matrix multiplication on the input vector and then decoding on the resulting vector.

Figure 5:
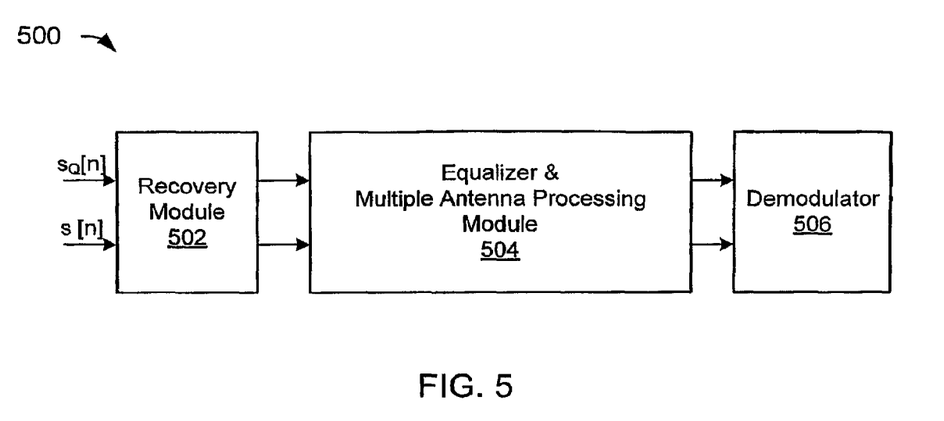
FIG. 5 depicts an alternative example of a DSP block.

In FIGS. 2, 3, and 4, the recovery, equalization, multiple antenna processing, and demodulation operations are performed sequentially. FIG. 5 depicts an alternative example a DSP block. The components are similar to those described with reference to FIG. 2, but the equalizer 204 and the multiple antenna processing module (206), are combined into an equalizer and multiple antenna processing module 504. This is intended to represent that, in the example of FIG. 5, equalization and multiple antenna processing are performed jointly.

Joint processing may depend on the specific multiple antenna processing technique being applied. Such techniques include, but are not limited to, spatial decoding, spatial demultiplexing, and/or beamforming. In particular, we may employ common techniques for spatial multiplexing such as Alamouti coding, BLAST and related techniques, and singular-value matrix decomposition and transmission along independent Eigen-dimensions. For beamforming we may use diversity techniques such as maximal-ratio combining, equal-gain combining, selection-combining, or optimal-combining. Alternatively, we may use phase shifting for beamsteering. Alternatively, we may use weighting for minimizing the mean-square-error (MSE) for the received signal, or a combination of beamsteering, diversity-combining, and/or weighting to minimize the signal's MSE.

Figure 6A:
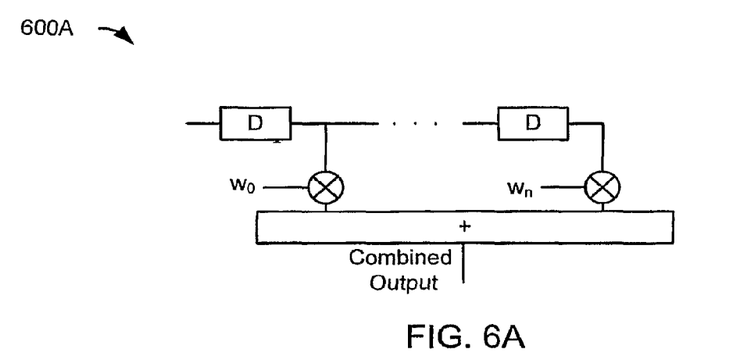
FIGS. 6A and 6B depict examples of equalizer and multiple antenna processing modules for use in a DSP block.
Figure 6B:
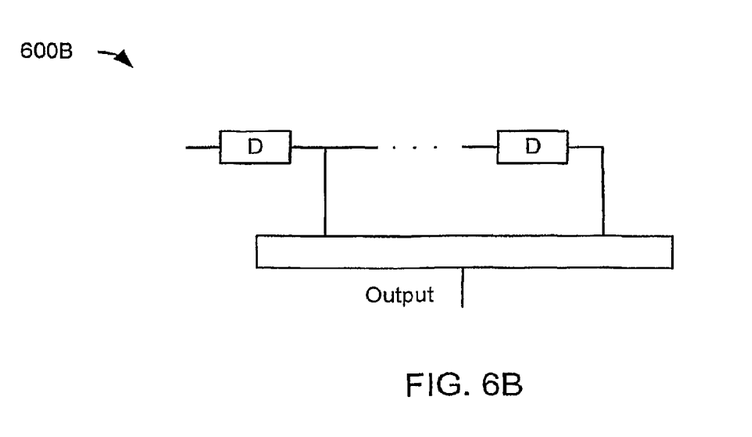

FIGS. 6A and 6B depict examples of equalizer and multiple antenna processing modules for use in a DSP block. In the examples of FIGS. 6A and 6B, equalization and multiple antenna processing are performed jointly. Both tapped delay-line equalization and beamforming (including diversity-combining and beamsteering) entail multiplication of the individual antenna samples by specific weights, which can be combined for joint processing. In particular, tapped delay-line equalization applies weighting to mitigate IASI (and ISI). For example, zero-forcing equalization uses weights that remove IASI (and IST) without consideration of noise enhancement. Minimum mean-square-error (MMSE) equalization determines weights to balance IASI (and ISI) mitigation with noise enhancement so as to minimize the mean-square-error of the received symbol. Decision-feedback equalization uses weights for zero-forcing or MMSE based on both a linear filter and a feedback filter. For maximal-ratio combining of multiple antenna signal inputs, weights are determined to maximize the signal-to-noise ratio of the combined signal. In selection-combining, all weights are zero except for the weight of the antenna with the highest signal-to-noise ratio. By multiplying the weights associated with equalization and beamforming, the joint benefits of both can be obtained. In the example of FIG. 6B, space-time decoding and/or spatial demultiplexing performed by the multiple antenna processing module generally entails a different form of processing resulting in a joint design of equalization and space-time decoding and/or demultiplexing that differs when equalization is combined with beamforming. In an embodiment, the space-time processor could perform space-time decoding and/or spatial demultiplexing directly on the received signal with IASI from other antennas.

Figure 7:
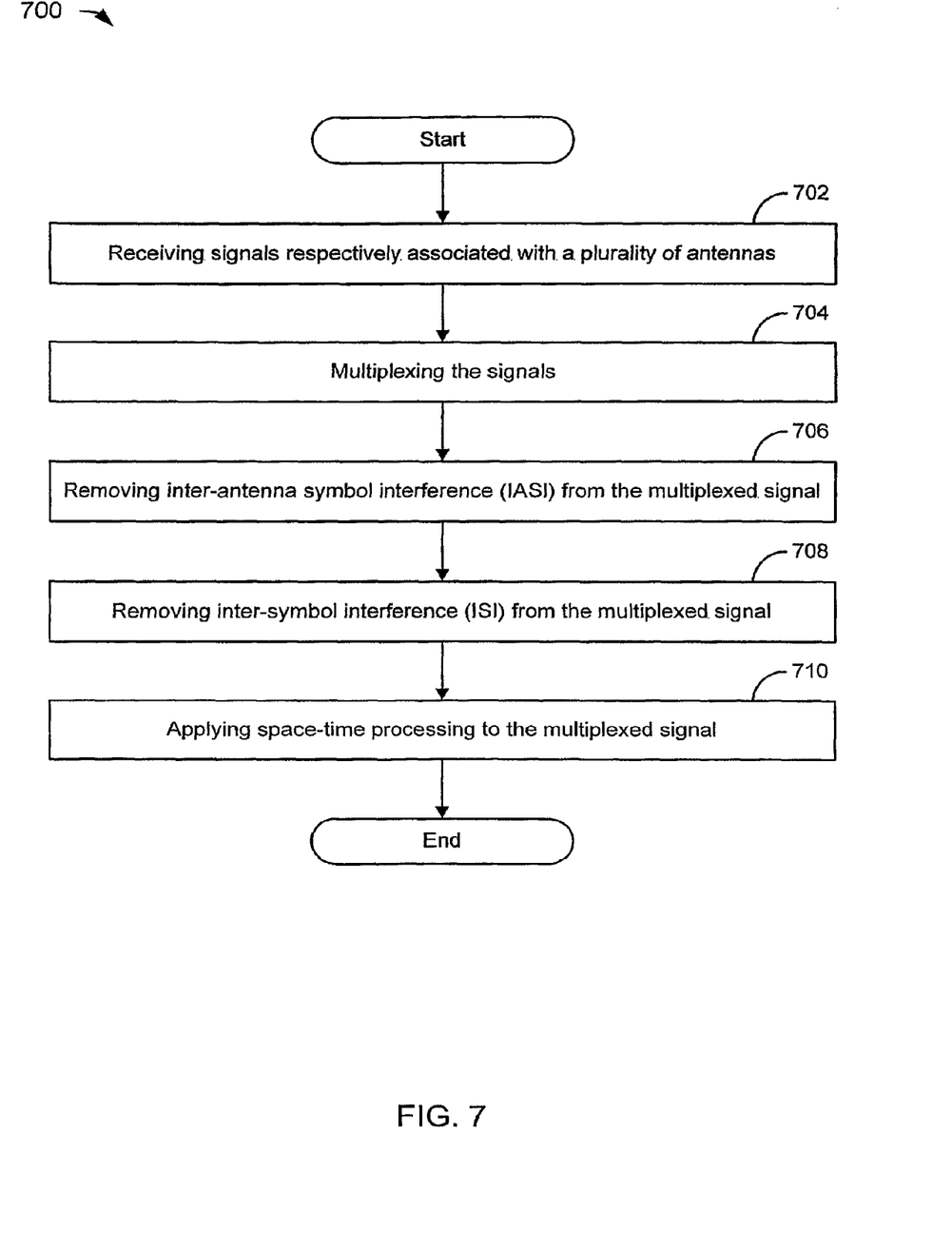
FIG. 7 depicts a flowchart of an example of a method for MARS signal processing.

FIG. 7 depicts a flowchart 700 of an example of a method for MARS signal processing. In the example of FIG. 7, the flowchart 700 starts at module 702 with receiving signals respectively associated with a plurality of antennas. In the example of FIG. 7, the flowchart 700 continues to module 704 with multiplexing the signals. In the example of FIG. 7, the flowchart 700 continues to module 706 with removing IASI from the multiplexed signal. In the example of FIG. 7, the flowchart 700 continues to module 708 with removing ISI from the multiplexed signal. In the example of FIG. 7, the flowchart 700 ends at module 710 with performing space-time processing on the multiplexed signal.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An apparatus for processing signals received on a multiple antenna receiver system (MARS), comprising:
    a plurality of antennas;
    a switch coupled to the plurality of antennas for switchable coupling to each selected one of the plurality of antennas in sequence, to form a single analog signal with discrete sequential samples from each of the antennae;
    an analog-to-digital converter (ADC) coupled to the switch;
    a switch synchronization and control block coupled to both the switch and to the ADC to synchronize the operation of the switch and the ADC such that the ADC converts the single analog signal from the switch to sampled digital signals from each antennae; and
    a digital signal processing (DSP) block, coupled to the ADC, for processing the sampled digital signals from each antenna to remove inter-antenna symbol interference (IASI) and inter-symbol interference (ISI), and wherein the DSP block includes:
        an equalizer to filter the signals received from the antennas into filtered signals;
        a multiple antenna processing module; and
        a demodulator for applying a technique selected from the group of techniques consisting of orthogonal frequency division multiplexing (OFDM), direct sequence spread spectrum (DSSS), complementary code keying (CCK).

2. The apparatus of claim 1, wherein the equalizer removes IASI interference from the filtered signal.

3. The apparatus of claim 1, wherein the multiple antenna processing module includes one or more modules selected from the group consisting of a space-time decoder, a diversity combining module, and a beamforming module.

4. The apparatus of claim 1 wherein the equalizer and the multiple antenna processing module perform tasks sequentially or jointly.

5. A method for processing signals received on a multiple antenna receiver system (MARS), comprising:
    providing a plurality of antennas;
    switchably coupling to each one the plurality of antennas in sequence to form a single analog signal with discrete sequential samples from each of the antenna;
    synchronously converting from analog-to-digital the single analog signal from the switchably coupling act into corresponding discrete digital signals from each antennae;
    receiving digitized I-signal and Q-signal components, of the digital signals from each antenna converted in the converting act;
    recovering the timing, phase, and frequency associated with the received I-signal and Q-signal components;
    equalizing the I-signal and Q-signal components to compensate for inter-antenna symbol interference (IASI) and inter-symbol interference (ISI); and
    space-time processing the I-signal and Q-signal to reproduce the plurality of signals received from the plurality of antennas.

* * * * *